United States Patent Office 3,000,820
Patented Sept. 19, 1961

3,000,820
THIXOTROPIC OLEAGINOUS COMPOSITIONS CONTAINING THE REACTION PRODUCT OF AN ABIETYL AMINE AND AN ORGANIC PHOSPHATE
Roy J. Eisenhauer, Chicago, Ill., and Stephen J. Zajac, Whiting, Ind., assignors to Standard Oil Company, Chicago, Ill., a corporation of Indiana
No Drawing. Filed Apr. 15, 1959, Ser. No. 806,418
15 Claims. (Cl. 252—32.5)

This invention pertains to thickening agents in oleaginous compositions and more particularly refers to thixotropic oleaginous compositions containing such thickening agents.

In many uses of oleaginous compositions, thixotropic properties are very desirable. Such properties allow a thickened oleaginous composition to soften under sheer stress and then regain its consistency in the absence of sheer stress. For example, in the application of pigmented paints it is often desirable to use a thickened paint which will not readily spill from a container or drop from an applicator, such as a brush or spray apparatus, and which will still soften sufficiently under sheer stress exerted by the applicator so as to provide a fine and even coat of paint over a given area. After application and the removal of the exerted stress, i.e. after brushing has been completed, it is also desirable that the thickened paint composition regain its consistency to minimize dripping, running, etc. As another example of the use in such thixotropic oleaginous compositions, in the formulation of forging or extrusion compounds it is desirable to suspend graphite in the composition so that the graphite will not settle out, and yet have a thin and softened fluid composition at the forging or extrusion working surface. Although such forging or extrusion compounds having a stable graphite suspension are in common use, such compounds normally contain such thickeners as petrolatum, metallic soaps or alkaline soaps. Although these compositions yield thixotropic gels, the degree of thixotropy is not sufficient for the base oil in the composition to behave as a lubricating liquid under mild sheer.

We have discovered a new composition which is useful as a thixotropic thickener for oleaginous compositions. We have further provided oleaginous compositions containing a thixotropic thickening agent for suspending finely divided solids in oleaginous compositions. The new thickening agent of this invention is an oil-soluble reaction product of an abietyl amine with a dialkyl or diaryl or alkyl aryl phosphate in combination with a fatty acid. The thickener agent may be used in amounts of from about 0.5 to about 10.0 weight percent and preferably from about 0.8 to about 4.0 weight percent in an oleaginous base vehicle and is capable of suspending up to about 40 weight percent or more of a finely divided solid in the resulting thixotropic composition. The thickener agent may be prepared and marketed in concentrates containing from about 10 to about 75 weight percent of the agent in an oleaginous base. Concentrates may be prepared simply by reducing the amount of oleaginous base present during the reaction.

The thickened compositions of this invention may be prepared by heating a mixture of the abietyl amine, the phosphate, fatty acid, and the oleaginous base at a temperature of from about 50° F. to about 250° F. and preferably from about 80° F. to less than 190° F. while agitating the mixture. After the reaction is complete i.e. from about 5 to about 20 minutes, the mixture is allowed to cool with agitation to a temperature of from about 160° F. to about 110° F. and the product may then be poured. By "pouring" the product, it is means that upon completion of the reaction the product is "poured" from the reaction vessel to another container. The container into which the product is "poured" is preferably a shallow container allowing greater surface area of the product to be exposed; however trays, vessels or even marketing containers may advantageously be used. The finely divided suspendable solid may be added at any time during the reaction.

Alternatively, the abietyl amine and oil may be admixed and heated to the reaction temperature and the phosphate and fatty acid may then be added to the oil and amine mixture to complete the reaction. The suspendable solid is then added to the resulting product before cooling. As another alternative, the suspended solid may be added to the oleaginous base and then admixed with the abietyl amine and heated to the reaction temperature. The phosphate may be added to complete the reaction and the fatty acid may then be added before cooling. Other alternatives will be obvious from the herein stated descriptions and illustrations. In all methods of preparation the finely divided suspendable solid may be added at any time during the reaction. For higher yields from the reaction it is preferred to add the abietyl amine and phosphate before the fatty acid and add the fatty acid only after the abietyl amine and phosphate have had sufficient time to react.

After the reaction, the product may be poured from the reaction vessel and may be tested for penetration. The product is ready for immediate use. There is no milling of the product after the reaction. If an inferior yield of product is obtained the reaction should be carried out at a lower temperature within the above limits.

In the above methods of forming the compositions of this invention, from about 0.5 to about 3.0 and preferably from about 0.9 to about 1.2 moles of the abietyl amine are used per mole of the phosphate are used. The oleic acid is added in amounts of from 0.05 to about 1.0 and preferably from about 0.2 to about 0.5 mole per mole of the abietyl amine. The total amount of abietyl amine and phosphate should exceed 0.4 weight percent but should not be greater than 10.0 weight percent for a suitable thixotropic oleaginous composition to be formed. It is preferred that the total abietyl amine and phosphate should be in the range of from about 0.8 to about 4.0 weight percent. No more than about 4 weight percent fatty acid should be included in the final product since greater amounts have been found to prohibit the formation of a thickened composition.

Although the identity of the individual active ingredients of the thixotropic oleaginous compositions of this invention is unknown, and although we do not wish to be held to any theories, it is believed that the reaction forms a salt of the phosphate and abietyl amine in the oleaginous vehicle of the following structure:

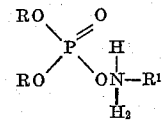

wherein the R's are the alkyl or aryl substituents of the phosphate and R¹ is the abietyl substituent. It is also believed that some of the fatty acid reacts with the abietyl amine to form a reaction product in the oleaginous vehicle, and some of the fatty acid is present as free fatty acid.

Examples of abietyl amines which can be used in the preparation of the above described thixotropic oleaginous compositions are dehydroabietyl amine, dihydroabietyl amine and tetrahydroabietyl amine or mixtures of such amines. A particularly well suited amine is a product marketed by Hercules Powder Company as "Rosin Amine D." This product is prepared by the catalytic hydrogenation of "Rosin Nitrile D" prepared by the action at elevated temperatures of ammonia on hydrogenated rosin. Distilled and undistilled grades are available as "Amine 750" and "Amine 751." The "Rosin Amine D" is a mixture of hydroabietyl amines in the following approximate proportion:

| "Rosin Amine D," | percent |
|---|---|
| Dehydroabietyl amine | 60 |
| Dihydroabietyl amine | 30 |
| Tetrahydroabietyl amine | 10 |

The phosphate which may be used in the above reaction are the dialkyl, diaryl, and alkylaryl phosphates having from 1 to about 20 carbon atoms per alkyl or aryl substituent and preferably from 2 to 16 carbon atoms. The following are examples of such organic phosphates: dimethyl phosphate, diethyl phosphate, methyl amyl phosphate, methyl octyl phosphate, dihexyl phosphate, dicyclohexyl phosphate, diphenyl phosphate, phenyl octyl phosphate, ditoluol phosphate, dioctyl phosphate, dicresyl phosphate, di(5-ethyl-2-nonyl) phosphate, dilauryl phosphate, dimyristerol phosphate, dinaphthenyl phosphate, di(7-ethyl-2-methyl-4-unidecyl) phosphate, dioctadecyl phosphate, dieicosyl phosphate, etc. Particularly preferred are diethyl phosphate and dilauryl phosphate. Diethyl phosphate is commercially available in large quantities of acceptable commercial purity. Dilaurly phosphate may be obtained commercilly in admixture with higher and lower dialkyl phosphates wherein dilauryl phosphate predominates. One such commercial product is "Ortholeum 162," produced by Du Pont de Nemours Company. "Ortholeum 162" is a mixture of long chain dialkyl phosphates predominating is dilauryl phosphate and is especially useful in preparing the thixotropic oleaginous compositions of the present invention.

The fatty acids which may be used are the saturated or unsaturated aliphatic (open chain) carboxylic acids having from about 10 to about 18 carbon atoms. Such fatty acids include the following carboxylic acids: undecylic acid, lauric acid, tridecylic acid, myristic acid, pentadecylic acid, palmitic acid, margaric acid, stearic acid, oleic acid, linoleic acid, linolenic acid, and the like. Dimers and trimers of the above listed acids may also advantageously be used in this invention. The particularly preferred fatty acid is oleic acid primarily because of its commercial availability, advantageously oleic acid in admixture with other fatty acids as well as mixtures of other fatty acids may also be used. Such fatty acid mixtures which predominate in oleic acid such as those derived from animal fat or tall oil are particularly advantageous.

Oleaginous base vehicles which can be used in forming the herein described thixotropic oleaginous compositions of the product invention can be silicone polymer oils, mineral oils, synthetic hydrocarbon oils, synthetic oils such as polyalkylene glycols and their derivatives, high molecular weight esters of dicarboxylic acids, polyfluoro derivatives of organic compounds such as the trifluorovinyl chloride polymers known as "Fluorolube" (made by Hooker Chemical Company), the trifluoroethylene polymers, and other lubricant vehicles.

The silicone polymer oils which may be employed in accordance with the present invention are advantageously, although not necessarily, those falling substantially within the lubricating oil viscosity range. Among such oils are dimethyl silicone polymer, chlorophenylmethyl silicone polymer, phenylmethyl silicone polymer, etc. A particularly desirable phenylmethyl silicone polymer for use in accordance with the present invention is Dow Corning 550 Silicone Fluid, a product of Dow-Corning, Inc. Another suitable silicone polymer is a chlorophenylmethyl silicone marketed as GE 81406 by General Electric Company.

Other oleaginous vehicles which may be employed herewith are, for example, mineral oils in the lubricating oil viscosity range, i.e. from about 50 SSU at 100° F. to about 300 SSU at 210° F. These mineral oils may be suitably solvent extracted, with phenol, furfural, B,B'-dichlorodiethylether (Chlorex), liquid $SO_2$, nitrobenzene, etc. Black asphaltic base oils and the like are also usable. Synthetic oils resulting from polymerization of unsaturated hydrocarbons or other oleaginous materials such as high molecular weight polyoxyalkylene compounds such as polyalkylene glycols and esters thereof, aliphatic diesters of dicarboxylic acids such as the butyl, hexyl, 2-ethylhexyl, decyl, lauryl, etc. esters of sebacic acid, adipic acid, azelaic acid, etc., may be employed in the present invention to produce excellent thixotropic compositions of value as lubricants. Polyfluoro derivatives of organic compounds, particularly hydrocarbons, and dibacic acid esters of $H(CF_2)_nOH_2OH$ can be thickened to form thixotropic compositions of the present invention. Other synthetic oils, such as esters of aliphatic carboxylic acids and polyhydric alcohol, e.g. trimethylolpropane pelargonate, pentaerythritol hexanoate, can also be used as suitable oil vehicles.

Glass and metal working fluids such as hydrocarbon fluids having good lubricating properties, cooling properties and load-bearing properties may also constitute the oleaginous base used in accordance with this invention. Among such fluids are the paraffin-base or naphthene base lubricants and particularly the lower viscosity fluids such as gas oil, kerosene, kerosene distillate, light paraffin oils, fuel oil, straw oil, mineral seal oil, etc. Other oleaginous bases are those materials used as paint vehicles and bases such as raw linseed oil, polymerized linseed oil, long-oil soya alkyd, mineral spirits, ester-gum solution, and the like. Many more usable oleaginous base vehicles not specifically mentioned herein will be obvious to those skilled in the art from our descriptions and illustrations of this invention.

The solid materials which may be suspended in the compositions of this invention are advantageously finely divided suspendible solid materials. The choice of such solid materials will necessarily depend upon the intended use of the thixotropic composition. For example, in formulating thixotropic paint compositions, finely divided color pigments, such as zinc oxide, titanium dioxide, white lead, and the like, may be suspended in the composition as well as can such pigment extend as magnesium silicate, mica, talc, diatomite, barium sulfate, clay, calcium sulfate, ground silica, calcium carbonate and the like. If soluble colors are used, no solid material at all need be suspended in the thixotropic paint. In metal working operations, e.g. forging die and extrusion operations, it is desirable to suspend solid lubricants such as graphite in the thixotropic metal working composition. Further, in metal grinding or glass grinding operations, a thixotropic metal or glass working lubricant may serve to carry detritus away from the working surface and suspend it in the body of lubricant.

The thixotropic oleaginous compositions of this invention may also be used as lubricants for operating machinery. A particular such use is in the presence of low clearance bearings; working of a thixotropic lubricant in the presence of such bearings causes the lubricant to freely flow between bearing surfaces and when working is ceased the lubricant sets up to prevent leakage of the lubricant. Further, the thixotropic composition may be used as a fairly permanent supply of lubricant in places where oils or lighter lubricants may be lost by evaporation or leakage, such as, for example, in the interiors of locks. In such use, insertion or turning of a key or dial causes the composition to become fluid and lubricate the lock and, after working, the composition regains its gel-like consistency minimizing loss by leakage and evaporation. Thus, the lock is lubricated with every opening or closing with minimum loss of lubricant.

It is to be understood that other ingredients may be present in the compositions of this invention either as individual ingredients selected for particular functions or even as other thixotropic agents supplementing the action of the hereindescribed compositions. Such other ingredients include antioxidants, corrosion inhibitors, wood preservants, pesticides, rust inhibitors, lubricity agents, extreme pressure agents, masking agents, anti-foam agents, etc.

The following examples further describe the thixotropic characteristics of the thixotropic compositions of this invention and are included herein as illustrations of this invention.

EXAMPLE I 4.4 g. (0.88 weight percent) of "Rosin Amine D" and 1.6 g. (0.32 weight percent) of "Ortholeum 162" were added to a mixture of 215.6 g. (42.89 weight percent) Mid-Continent SAE 50 mineral lubricating oil and 200.8 g. (40.32 weight percent) Mid-Continent SAE 10 mineral lubricating oil and heated to a temperature of 150° F. for 10 minutes. 3.2 g. (0.64 weight percent) of oleic acid and 75.0 g. (15.0 weight percent) of 4X graphite (Cummings Moore graphite) were added. The reaction mixture was cooled while agitating to about 140° F. and poured. The unworked, worked and reset ASTM penetrations are given in Table I.

EXAMPLE II 15.0 g. (1.5 weight percent) of "Rosin Amine D" and 6.3 grams (0.63 weight percent) diethyl phosphate were heated in 821.7 g. (82.17 weight percent) black asphaltic base oil at a temperature of 160° F. for about 10 minutes. 7.0 g. (0.7 weight percent) of oleic acid and 150.0 g. (15.0 weight percent) of 4X graphite were added. The mixture was then cooled while agitating to 100° F. and poured. Unworked, worked and reset ASTM penetrations are given in Table I.

EXAMPLE III 9.75 g. (1.95 weight percent) of diphenylphosphate, 13.0 g. (2.6 weight percent) of "Rosin Amine D" and 75.0 g. (15.0 weight percent) of amorphous graphite were added to 396.0 g. (79.2 weight percent) of Mid-Continent SAE 20 mineral lubricating oil. The mixture was heated at about 170° F. for about 10 minutes and then cooled with agitation to 160° F. and poured. ASTM penetrations are reported in Table I below.

*Table I*

ASTM PENETRATIONS

| Example | Unworked | Worked (3 strokes) | Reset After 3 Days Standing [1] |
|---|---|---|---|
| I | 285 | 442 | 317 |
| II | 315 | 396 | 330 |
| III | 435 | Fluid | |

[1] The samples were allowed to stand quiescent for 3 days after worked penetration was taken and the ASTM penetration was again taken to determine the ability of the sample to regain its grease-like consistency or "reset."

EXAMPLES IV TO XV

In order to demonstrate the amounts of fatty acid useable to promote the thixotropic gel in the present invention, a blend of 26.0 g. (1.3 weight percent) of "Rosin Amine D," 14.0 g. (0.7 weight percent) of "Ortholeum 162" and 1960 g. (98 weight percent) of Mid-Continent SAE 20 mineral lubricating oil was made by mixing without heat. The blend was divided into five equal samples (Examples IV to VIII) and a differing amount of oleic acid was added to each as indicated in Table II. After addition of oleic acid, each sample was heated to 200° F. with mixing for 10 minutes. Each sample was then allowed to cool to 77° F. The unworked, worked and reset ASTM penetrations were then taken for each sample as indicated in Table II below:

*Table II*

ASTM PENETRATIONS

| Sample | Fatty Acid Wt. percent | Unworked | Worked (3 strokes) | Reset after 3 Days Standing |
|---|---|---|---|---|
| Example IV | 0 | 345 | 575 | fluid |
| Example V | 0.5 | 268 | 478 | 320 |
| Example VI | 1.0 | 213 | 417 | 203 |
| Example VII | 2.0 | 343 | 615 | 300 |
| Example VIII | 4.0 | fluid | | |

From the data of Table II it can be seen that in an oleaginous composition containing as active materials abietyl amine and phosphate in a ratio of 13 parts to 7 parts, the addition of about 10 parts of fatty acid based on the active materials gives a thixotropic oleaginous composition having a high "false" gel and excellent work down properties.

Results comparable with the above were also obtained with a different blend and another method of preparing the thixotropic compositions. Accordingly, a blend of 70.0 g. (3.5 weight percent) of "Rosin Amine D," 30.0 g. (1.5 weight percent) of diethyl phosphate and 1900 g. (95 weight percent) of Mid-Continent SAE 20 mineral lubricating oil was mixed at 160° F. for 15 minutes. Increments of oleic acid were added while stirring. The amounts of the increments are indicated in Table III. After each addition of oleic acid, samples (Examples IX to XV) were taken and placed in cups for ASTM penetration determination. The samples were left quiescent until they cooled to 77° F. and ASTM penetrations as reported in Table III were then taken.

*Table III*

ASTM PENETRATIONS

| Sample | Fatty Acid Increment Wt. percent | Unworked | Worked (3 strokes) | Reset after 3 Days Standing |
|---|---|---|---|---|
| Example IX | 0 | 424 | 539 | 380 |
| Example X | 0.5 | 343 | 497 | 297 |
| Example XI | 1.0 | 307 | 552 | 249 |
| Example XII | 1.5 | 297 | 516 | 255 |
| Example XIII | 2.0 | 316 | 533 | 298 |
| Example XIV | 3.0 | 434 | fluid | fluid |
| Example XV | 4.0 | fluid | | |

From the data of Table III, where 35 parts abietyl amine and 15 parts phosphate are included in the active ingredients, an optimum of 5 to 15 or about ten parts fatty acid was found.

EXAMPLES XVI TO XX

The effect of varying amounts of total thickener on thixotropy was studied in these examples. Accordingly, a concentrate of thixotropy improving additive was prepared by mixing 22 parts of diethyl phosphate, 52 parts of "Rosin Amine D" and 26 parts of oleic acid. The concentrate was added to a Mid-Continent SAE 20 mineral base oil in amounts sufficient to provide the concentrate content in each example as indicated in Table IV to form varying reactant mixtures. Each reactant mixture was heated to 140° F. for 10 minutes and poured at 140° F. Graphite was mixed in before pouring in amounts sufficient to afford the indicated graphite content. The ASTM penetrations are given in Table IV.

Table IV
ASTM PENETRATIONS

| Example | Concentrate Content Wt. percent | Graphite Content Wt. percent | Unworked | Worked (3 strokes) | Reset After 3 Days Standing |
| --- | --- | --- | --- | --- | --- |
| XVI | 1.92 | 15.0 | 338 | 443 | 357 |
| XVII | 2.88 | 15.0 | 223 | 367 | 259 |
| XVIII | 3.83 | 15.0 | 258 | 357 | 248 |
| XIX | 5.75 | 14.8 | 114 | 314 | 114 |

In view of the above results, the consistency of a thixotropic oleaginous composition may be regulated conveniently by the total amount of the abietyl amine-organic phosphate reaction product and fatty acid included in the composition. As an example of using varying amounts of active ingredients to provide a thixotropic oleaginous composition of a particular desired consistency, it was desired to provide a forge die lubricant composition which was sufficiently fluid to be easily poured and conveniently used in forge die operations, while still maintaining thixotropy and the ability to suspend large amounts of finely divided solids, i.e. graphite. Such a composition (Example XX) was prepared having an active material content of only 0.8 weight percent and a suspended graphite content of 20 weight percent. Accordingly, 5.0 g. (0.5 weight percent) of "Rosin Amine D" and 2.0 g. (0.2 weight percent) of diethyl phosphate were mixed with 792 g. (79.2 weight percent) of black asphaltic base oil and the mixture was reacted at about 130° F. for about 10 minutes. The reaction mixture was allowed to cool to 110° F. while agitating and then poured. The following ASTM penetrations were taken at 77° F.

Table V
ASTM PENETRATION

| Example | Unworked | First Worked[1] | First Reset[2] | Second Worked[3] | Second Reset[2] |
| --- | --- | --- | --- | --- | --- |
| XX | 504 | 528 | 505 | 565 | 479 |

[1] Five strokes.
[2] After standing quiescent overnight.
[3] Sixty strokes.

EXAMPLES XXI TO XXIX

The maximum reaction temperature depends upon the reactants used, but should not normally exceed 250° F. for the formation of compositions of this invention, using a particular set of reactants within the scope of this invention, we have further determined that in the manufacture of the thixotropic oleaginous compositions of this invention, the temperature of any particular phosphate-abietyl amine reaction influences yield of the particular reaction product in the composition and resulting thixotropy of the composition. For example, nine reaction mixtures were prepared, each containing, as based on final composition: 1.1 weight percent of "Rosin Amine D," 0.6 weight percent of "Ortholeum 162," 0.8 weight percent of oleic acid, 42.5 weight percent Mid-Continent SAE 50 mineral base oil, 40.0 weight percent of Mid-Continent SAE 10 mineral base oil. The reaction mixtures were each heated to a different pour temperature as indicated in Table VI and 15.0 weight percent of 4X graphite was added to each; the resulting compositions were then poured into penetration cups for ASTM penetration determinations as reported in Table VI. The time required for a visible set or increase in consistency to occur was noted and is recorded in Table VI, below. ASTM penetrations were taken at 77° F.

Table VI
ASTM PENETRATIONS

| Example | Temperature at Pouring °F. | Time set Visible, Min. | Unworked | Worked (3 strokes) | Reset[1] |
| --- | --- | --- | --- | --- | --- |
| XXI | 90 |  | 222 | 401 | 241 |
| XXII | 100 |  | 206 | 412 | 215 |
| XXIII | 110 |  | 196 | 417 | 211 |
| XXIV | 120 | 2 | 173 | 349 | 290 |
| XXV | 140 | 12 | 183 | 378 | 330 |
| XXVI | 150 | 12 | 295 | 361 | 300 |
| XXVII | 160 | 10 | 262 | 408 | 295 |
| XXVIII | 170 | 12 | 234 | 466 | 302 |
| XXIX | 190 | 240 | 335 | fluid | fluid |

[1] After quiescent standing for 5 days.

In the above examples, good thixotropy was obtained up to and including the 170° F. pour temperature, poor thixotropy was obtained at 190° F. Therefore, we prefer to carry out the reaction between "Ortholeum 162" and "Rosin Amine D" and to pour the resulting composition all at a temperature less than 190° F. For other reactants, the maximum temperature may vary but in all cases the maximum temperature may be determined by the procedure of the above examples and useable compositions of this invention may be prepared at temperatures as high as 250° F.

It is evident from the above that we have provided new and useful thixotropic oleaginous compositions containing, as active ingredients, a fatty acid and the oil soluble reaction product of an abietyl amine with an organic dialkyl, diaryl or alkyl aryl phosphate, which compositions exhibit thixotropy even under mild shear conditions.

Therefore, we claim:

1. A thixotropic oleaginous composition comprising a major amount of an oleaginous base and a minor amount of the reaction product formed by reacting an abietyl amine with an organic phosphate selected from the class consisting of dialkyl phosphate, diaryl phosphates and alkyl aryl phosphates having from about 1 to about 20 carbon atoms in each alkyl and aryl substituent and a fatty acid having from about 10 to about 18 carbon atoms at a temperature in the range of from at least about 80° F. and less than about 190° F., said minor amount being effective in imparting thixotropy to said composition.

2. A thixotropic oleaginous composition comprising a major amount of an oleaginous base and a minor amount of the reaction product obtained from the reaction at a temperature in the range of from about 50° F. to about 250° F. of an abietyl amine with an organic phosphate selected from the class consisting of dialkyl phosphates, diaryl phosphates and alkyl aryl phosphates and having from 1 to about 20 carbon atoms in each alkyl and aryl substituent and a fatty acid having from about 10 to about 18 carbon atoms, said minor amount being effective in imparting thixotropy to said composition.

3. The thixotropic oleaginous composition of claim 2 wherein the organic phosphate is diethyl phosphate.

4. The thixotropic oleaginous composition of claim 2 wherein the organic phosphate is dilauryl phosphate.

5. The thixotropic oleaginous composition of claim 2 wherein the organic phosphate is diphenyl phosphate.

6. The thixotropic oleaginous composition of claim 2 wherein the fatty acid is oleic acid.

7. The thixotropic oleaginous composition of claim 2 wherein the abietyl amine comprises a mixture of dehydroabietyl amine, dihydroabietyl amine and tetrahydroabietyl amine.

8. The thixotropic oleaginous composition of claim 2 containing a finely divided suspended solid in an amount less than about 40 weight percent.

9. A new composition of matter exhibiting thixotropy in an oleaginous base which composition comprises the reaction product formed by reacting an abietyl amine with an organic phosphate selected from the class consisting of dialkyl phosphates, diaryl phosphates and alkyl aryl phosphates having from about 1 to about 20 carbon atoms in each alkyl and aryl substituent and a fatty acid having from about 10 to about 18 carbon atoms, in the presence of an oleaginous base at a temperature of from about 50 to about 250° F., the mole ratio of said amine to said phosphate being from about 1:2 to about 3:1 and the mole ratio of said acid to said amine being from about 1:1 to about 1:20.

10. As a new composition of matter, an additive concentrate comprising an oleaginous lubricant base containing from about 10 to about 75 weight percent of a component which comprises the reaction product formed by reacting at a temperature of from about 50 to about 250° F. an abietyl amine with an organic phosphate selected from the class consisting of dialkyl phosphates, diaryl phosphates and alkyl aryl phosphates having from about 1 to about 20 carbon atoms in each alkyl and aryl substituent and a fatty acid having from about 10 to about 18 carbon atoms, in the presence of an oleaginous base, the mole ratio of said amine to said phosphate being from about 1:2 to about 3:1 and the mole ratio of said acid to said amine being from about 1:1 to about 1:20, said concentrate being capable of dilution with an oleaginous base to form a thixotropic oleaginous composition containing from about 0.5 to about 10 weight percent of said component.

11. As a new composition of matter, a major amount of an oleaginous lubricant base and a minor thixotropy-imparting amount therein of the product derived from the reaction of a mixture at from about 50° F. to about 250° F. of from about 0.4 to about 8.0 weight percent of an abietyl amine, from about 0.2 to about 6.0 weight percent of a free fatty acid having from about 10 to about 18 carbon atoms and from about 0.1 to about 4.0 weight percent of an organic phosphate selected from the dialkyl phosphates, diaryl phosphates and alkyl aryl phosphates having from about 1 to about 20 carbon atoms in each alkyl and aryl substituent, said product being present in a total amount sufficient to impart thixotropy to the composition and the ingredients of the reaction mixture being present in said mixture in a ratio of said amine to said phosphate of from about 1:2 to about 3:1 and said fatty acid to said amine of from about 1:1 to about 1:20.

12. A new thixotropic oleaginous lubricant composition prepared by reacting an abietyl amine, a fatty acid having from about 10 to about 18 carbon atoms, and an organic phosphate selected from the class consisting of dialkyl phosphates, diaryl phosphates having from about 1 to about 20 carbon atoms in each alkyl and aryl substituent, at a temperature in the range of from about 50° F. to about 250° F. and alkyl aryl phosphates, in a major amount of an oleaginous lubricant, the resulting reaction product being present in said oleaginous lubricant in sufficient total and relative amounts to thicken said lubricant and impart thixotropy to the resulting composition.

13. A thixotropic oleaginous lubricant composition prepared by mixing from about 99.5 to about 90 weight percent of an oleaginous lubricant base with from about 0.5 to about 10 weight percent of a component consisting essentially of an abietyl amine, from about 0.05 to about 1.0 moles of a free fatty acid per mole of said amine and from about 1/3 to about 2 moles of an organic phosphate per mole of said amine, said organic phosphate being selected from the class consisting of dialkyl phosphates, diaryl phosphates and alkyl aryl phosphates and having from 1 to about 20 carbon atoms in each alkyl and aryl substituent.

14. The method of preparing a thixotropic oleaginous composition which method comprises mixing a major amount of an oleaginous base with from about 0.4 to about 8.0 weight percent of an abietyl amine, from about 0.1 to about 4.0 weight percent of a free fatty acid having from about 10 to about 18 carbon atoms and from about 0.2 to about 6.0 weight percent of an organic phosphate selected from the class consisting of dialkyl phosphates, diaryl phosphates and alkyl aryl phosphates having from 1 to about 20 carbon atoms in each alkyl and aryl substituent, and subjecting the resulting reaction mixture to a temperature in the range of from about 50° F. to about 250° F.

15. The method of increasing the thixotropy of an oleaginous base which comprises mixing with said base from about 0.4 to about 5.0 weight percent of an abietyl amine, from about 0.1 to about 3.0 weight percent of a free fatty acid having from about 10 to about 18 carbon atoms, and from about 0.2 to about 4.0 weight percent of an organic phosphate selected from the class consisting of dialkyl phosphates, diaryl phosphates and alkyl aryl phosphates and having from 1 to about 20 carbon atoms in each alkyl and aryl group, at a temperature of at least about 80° F. and less than about 190° F.

References Cited in the file of this patent

UNITED STATES PATENTS

| | | |
|---|---|---|
| 2,382,178 | Schilling et al. | Aug. 14, 1945 |
| 2,406,423 | Woodstock | Aug. 27, 1946 |
| 2,484,146 | Barber et al. | Oct. 11, 1949 |
| 2,664,400 | Woodstock et al. | Dec. 29, 1953 |
| 2,730,499 | Pokorny | Jan. 10, 1956 |
| 2,776,955 | Rosher | Jan. 8, 1957 |